United States Patent [19]
Nahajski et al.

[11] Patent Number: 5,479,724
[45] Date of Patent: Jan. 2, 1996

[54] METHOD AND APPARATUS FOR SCOUR DEPTH MEASUREMENT

[76] Inventors: Anthony P. Nahajski; Stuart E. Nahajski, both of 20411 12th Ave. NW., Seattle, Wash. 98177

[21] Appl. No.: 208,534

[22] Filed: Mar. 9, 1994

[51] Int. Cl.⁶ .............................. G01B 5/18; E21B 47/04
[52] U.S. Cl. .............................. 33/719; 33/720; 33/721; 33/DIG. 1; 73/290 R
[58] Field of Search .............................. 33/713, 716, 719, 33/720, 721, DIG. 1, 1 H, 521, 624, 625; 73/290 R

[56] References Cited

U.S. PATENT DOCUMENTS

| | | | |
|---|---|---|---|
| 2,550,004 | 4/1951 | Doll | 33/1 H |
| 4,006,637 | 2/1977 | Kinosita | 73/290 R X |
| 4,855,966 | 8/1989 | Cinquino | 33/713 X |

FOREIGN PATENT DOCUMENTS

| | | | |
|---|---|---|---|
| 0071621 | 4/1988 | Japan | 73/290 R |
| 1675685 | 7/1991 | U.S.S.R. | 73/290 R |

OTHER PUBLICATIONS

James Sherrill and Sean Kelly "Using Scour and Stream Instability Evaluations to Increase Bridge Safety," *Public Works* Jun.:56–57, 1992.

Thomas J. Fenner "Scoping Out Scour," *Civil Engineering* Mar.:75–77, 1993.

H. N. C. Breusers and A. J. Raudkivi, *Scouring*, A. A. Balkema, Rotterdam, The Netherlands, 1991, pp. 94–97.

*Primary Examiner*—Alvin Wirthlin
*Attorney, Agent, or Firm*—Seed and Berry

[57] ABSTRACT

A method and apparatus for measuring scour depth in a waterway bed is described. The apparatus utilizes magnetic attraction between a weight resting on the waterway bed and a magnetic probe within a guide chamber to which the weight is attached. Magnetic attraction between the probe and the weight retains the probe in an aligned position with the weight, enabling a user to detect a reduced force in the support line to identify the location of the weight and thus the riverbed. In a second embodiment, the inventive device includes a second weight slidably attached to the guide enabling a measurement of infill in a waterway bed scour. In the method according to the invention, the weight is placed upon the waterway bed and allowed to rest there. A probe is then inserted into the chamber and allowed to descend to the level of the weight where magnetic attraction supports the probe. The location is identifiable by a reduced tension in the support line, and the depth can be determined by measuring the length of the support line from the waterway surface to the probe.

16 Claims, 4 Drawing Sheets

METHOD AND APPARATUS FOR SCOUR DEPTH MEASUREMENT

TECHNICAL FIELD

The present invention relates to a method and apparatus for measuring scour depth using magnetic detection of a weight.

BACKGROUND OF THE INVENTION

Waterway scour is the scouring or evacuation of a waterway bed at or near waterway structures, typically caused by the flow of water along the waterway bed. When scour occurs at or near structures associated with bridges, it is referred to as bridge scour. (See "Scoping Out Scour," *Civil Engineering Magazine*, March 1993.)

Waterway scour is generally segregated into three types: general, constriction and local. General scour includes standard erosion due to general changes in water flow and sediment supply to a broad area. General scour does not usually include scour caused by bridges themselves or other man-made structures. Constriction scour is scour caused by increased water velocity due to the constriction of water flow. Local scour is scour around the bases of pilings and piers caused by turbulence from the pilings and piers themselves.

Scour is known to have serious detrimental effects, particularly near bridges. As the waterway bed is washed away near bridges, stability of the bridges can be reduced to the point of collapse. Measurement of scour depth is therefore useful in monitoring stability and repair needs for bridges and other waterway structures.

A determination of scour depth typically requires more than a simple water depth measurement. For example, after scour occurs near a piling or pier, sediment or infill may accumulate in the depression forming a secondary surface above the scoured waterway bed. While appearing visually to provide a continuous, relatively smooth waterway bed, the infill is often relatively soft and unstable. The infill provides only minimal support for pilings supposedly supported by the waterway bed. Thus, measurements which are unable to detect the actual scour depth of the waterway bed, as opposed to the depth of the secondary surface presented by the infill are of limited value.

Several techniques have been proposed for measurement of bridge scour, including subsurface interface radar, transducers, optical fathometers, physical probes, and visual inspection. All of these systems suffer from significant drawbacks.

Subsurface interface radar systems use transmitted electromagnetic pulses to perform scour depth measurements. In these systems, the electromagnetic pulses are directed through the water into the waterway bed. At the surface of the waterway bed and/or at interfaces between various subsurface layers, such as between infill and the waterway bed or between layers of differing materials in the waterway bed, reflections occur. The reflections are detected by the radar system and analyzed to produce information about the subsurface. In addition to being complex and expensive, the effectiveness of such systems are affected by the materials in and around the waterway bed. For example, subsurface interface radar systems provide limited accuracy in dense, moist clays and are ineffective in salt water. Such systems are also ineffective in other situations where the subsurface is conductive.

Acoustic systems utilize a transducer to transmit acoustic waves through the water into the subsurface. Reflections from the waterway bed and from within the subsurface are detected at the surface and provide information about the scour depth. Such systems require a power supply and relatively complex electronic devices. This makes them relatively expensive to produce and operate. Another difficulty inherent in such systems is that high concentrations of sediment in suspension scatter and absorb the acoustic pulses, making reflections difficult to detect or quantify.

Optical inspection of scour depth, including using divers or a submarine camera, provides some information about scour depth. As described above, such visual techniques provide no information about the subsurface and the presence of infill. This approach also requires expensive specialized equipment and expensive skilled labor. They also pose danger to divers in locations with high currents or traveling debris.

Still another method developed at the University of New Zealand as described in Breusers and Raudkivi (Breusers and RaudKivi, *Scouring*, A. A. Balkema, Rotterdam, The Netherlands, 1991.) employs radioactive sources and detectors. In this approach, a guide is driven into the waterway near a bridge piling. A weight containing a radioactive source is slidably attached to the guide and allowed to descend to the waterway bed. The radioactive weight rests upon the bed of the initial scour hole and slides down the outside of the guide as the scour hole deepens. As sediment fills the scour hole, the lead weight is covered by the sediment. To determine the depth of the radioactive weight, Raudkivi inserts a gamma ray probe inside of the guide and slides the probe down while trying to detect gamma ray radiation from the radioactive source. By monitoring the depth of the gamma ray probe, Raudkivi obtains a measurement of the scour depth.

The radioactive approach of Raudkivi provides a relatively accurate measurement of scour depth, while requiring a minimum of skilled labor. However, the system utilizes expensive, complex electronics and requires skilled labor to operate. Further, the use of radioactive materials poses a wide range of environmental and regulatory problems.

SUMMARY OF THE INVENTION

The present invention provides a method and apparatus for measuring scour depth. In the preferred embodiment of the method according to the present invention, a hollow stainless steel vertical guide sealed at its lower end and having a removable cap at its upper end is driven into the waterway. A bed detector including a ferromagnetic portion is slidably connected to the vertical guide and allowed to rest upon the waterway bed. The cap is detached and a magnetic probe is inserted in the central passageway of the vertical guide. The probe is allowed to descend in the passageway toward the bed detector by controllably feeding a cable attached to the probe. When the probe reaches the depth of the bed detector, the magnetic attraction between the probe and the ferromagnetic portion of the bed detector retains the probe in place.

A user determines the depth of the bed detector by monitoring the cable attached to the probe. When the cable goes slack, the probe is substantially aligned with the bed detector, with the elevation of the waterway bed being equal to the elevation of the top of the guide less the length of the played out cable. The probe is then removed and the cap reattached with the bed detector remaining submersed. At a later time (presumably after scour occurs), a second measurement of the depth of the waterway bed is made. The scour depth is readily determined by comparing the two measurements.

In an alternative embodiment of the method according to the present invention, a second bed detector is slidably attached to the vertical guide after sediment infill, or scour repair fill has covered the first bed detector. The second bed detector descends to the top, or secondary surface of the infill and remains thereon to provide a means of monitoring the surface of infill, To check the stability of the repair or of the infill the probe is controllably fed into the vertical guide until its attraction to the upper bed detector retains it in place. After this depth is determined, the probe is elevated a short distance above the upper bed detector and is allowed to descend quickly past the bed detector. The momentum of the probe enables it to overcome the magnetic attraction to the upper bed detector and descend past it toward the first (lower) bed detector. The cable is manipulated so that the probe descends controllably to the bed detector. When the probe reaches the depth of the first bed detector, it is held in place once again by magnetic attraction to the first bed detector. The depth of the bed detector is determined as before. The depth of the infill is determined by comparing the elevations of the two bed detectors.

The device according to the invention includes a vertical guide of a nonferromagnetic material (such as a stainless steel pipe) having a plug at its lower end which seals the lower end of the pipe and is adapted to ease penetration of the pipe into a waterway bed. A removable threaded cap is connected to the upper end of the vertical guide, forming a watertight seal. Mounting brackets (nonmagnetic) are welded to the vertical guide to provide the means for the vertical guide to be attached to a waterway structure.

A bed detector comprising a ferromagnetic portion preferably curved at its edges to reduce turbulent effects is slidably coupled to the vertical guide using C-shaped metal rings which surround a portion of the vertical guide and allow the bed detector to slide along the vertical guide. The device also includes a magnetic probe attached to a nonferromagnetic cable. The magnetic probe is shaped to be inserted into the vertical guide when the cap is removed and to travel within the vertical guide. The magnetic probe is preferably a ceramic magnet of suitable weight, or other magnetic probe with sufficient magnetic strength to retain it in substantial alignment with the bed detector. A cable is attached to the probe to allow a user to control the descent of the probe toward the bed detector. The support line includes indications of distance along the support line from the magnetic probe to indicate to a user the depth to which the magnetic probe has descended.

In an alternative embodiment of the inventive device, a second bed detector substantially similar to the first bed detector is slidably connected to the vertical guide to provide a means for measuring infill, or the stability of scour repair fill.

DETAILED DESCRIPTION OF THE INVENTION

Figure 1:
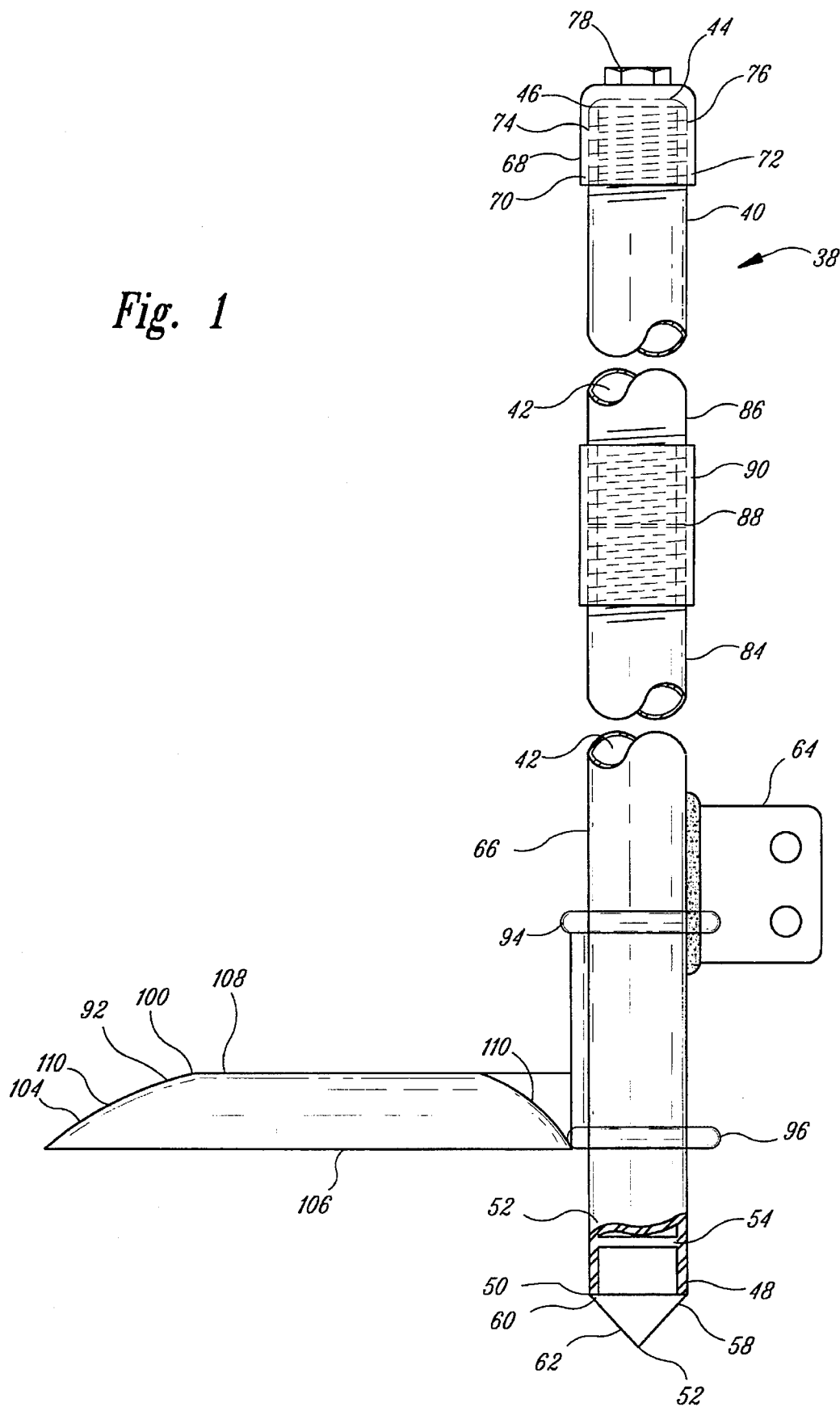
FIG. 1 is a side elevational view in partial cross-section of a preferred embodiment of the invention with the guide shown in shortened form for the convenience of illustration.

As shown in FIG. 1, the preferred embodiment of a scour depth measuring device 38 includes an elongated guide 40 of a nonferromagnetic material, preferably a heavy stainless steel pipe. A passageway 42 extends from an opening 44 at an upper end 46 of the elongated guide to an opening 48 at a lower end 50. The opening 48 at the lower end 50 is preferably sealed such as with a conical plug 52. The conical plug 52 is preferably a forced-fit, stainless steel plug having an intrusive portion 54 which engages an inner wall 56 of the passageway 42 and a lip 58 which extends beyond the inner wall 56 and engages a lower edge 60 of the elongated guide 40. When the conical plug 52 is press-fit with its intrusive portion 54 within the passageway 42 and the lip 58 engaged to the lower edge 60 of the elongated guide 40, a watertight seal is formed. The conical outer surface 62 of the conical plug 52 advantageously aids the penetration of the elongated guide 40 into a waterway bed. Other methods of providing a seal at the lower end 50 of the passageway 42 and for providing a surface adapted for penetration into a waterway bed may be used.

The elongated guide 40 may be constructed of a single piece; however, the guide is preferably formed from a plurality of guide sections 84, 86 joined together at a junction 88 using a standard threaded coupling 90 which holds the sections 84, 86 in axial alignment and forms a watertight seal at the junction 88. The use of a plurality of sections 84, 86 enables the elongated guide to be formed from standard, commercially available lengths of stainless steel pipe, and further eases the transportation of the scour depth measuring device 38 to an installation location, as it is easier to transport multiple short lengths of pipe than to transport pipes of substantial length.

A support bracket 64 is welded to an outer surface 66 of the elongated guide 40. The support bracket 64 includes a pair of mounting holes 80, 82, each of sufficient size to permit a shaft of a standard size bolt to be inserted therethrough. The mounting bracket 64, like the elongated guide 40, is of a nonferromagnetic material, such as stainless steel. While FIG. 1 presents only a single support bracket 64, it will be apparent to those skilled in the art that additional support brackets 64 may be welded along the length of the elongated guide to provide multiple points for attachment and additional strength. Further, other means of attachment, such as strapping are within the scope of the invention.

A cap 68 is attached at the upper end 46 of the elongated guide 40 to form a watertight seal to prevent water or other contaminants from entering the passageway 42. The cap 68 is retained to the elongated guide by the engagement of internal threads 70 along the internal surface 72 of the cap 68 which engage external threads 74 along an end portion 76 of the outer surface 66 of the elongated guide. To facilitate the removal and attachment of the cap, the cap includes a hexagonal nut end 78. The nut end is advantageously selected with dimensions adapted to engage a standard wrench.

Figure 2:
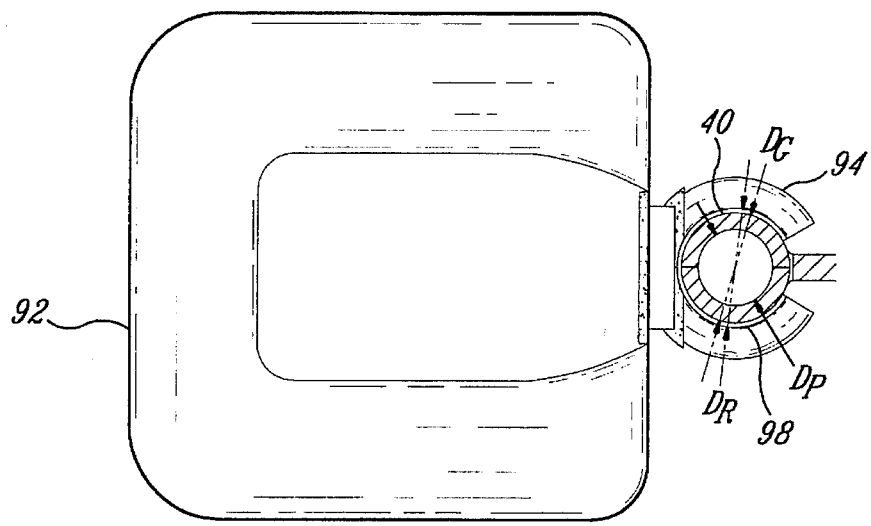
FIG. 2 is a top plan view of the bed detector of the embodiment of FIG. 1 with the guide and support bracket shown in partial cross-section.

The scour depth measuring device 38 also includes a bed detector 92 which is slidably connected to the elongated guide 40 by an upper coupling ring 94 and a lower coupling ring 96, both nonferromagnetic. As shown in the top cross-sectional view of FIG. 2, the upper coupling ring 94 and the lower coupling ring 96 are C-shaped rings which surround a portion of the elongated guide 40. The internal diameter $D_R$ of the upper and lower coupling rings 94, 96 is slightly larger than the outer diameter $D_G$ of the elongated guide 40 so that when the upper and lower coupling rings 94, 96 surround the elongated guide 40 a small gap 98 remains between the upper and lower coupling rings 94, 96 and the elongated guide 40.

The bed detector 92 includes a main body 100 rigidly secured to the upper and lower coupling rings 94, 96 by a connector plate 102. The bed detector and the connector plate are ferromagnetic. Preferably the main body 100 and the connector plate 102 are constructed of a ferromagnetic material such as steel. To limit corrosion, the main body 100 and the connector plate include a protective coating 104, such as galvanization or a rust inhibiting paint.

The main body 100 includes a planar contact surface 106 in a substantially horizontal position and an upper surface 108 preferably having curved upper margins 110. The curved upper margins 110 advantageously reduce turbulence and related scouring effects caused by the main body 100 as water flows past the bed detector 92.

Figure 3:
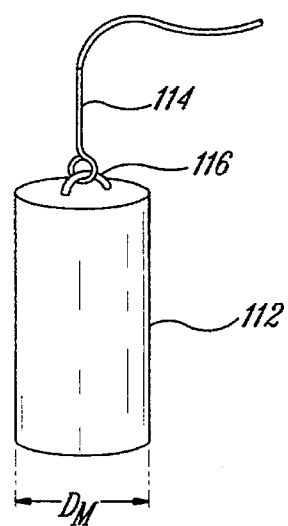
FIG. 3 is an isometric view of a magnetic probe and nonferromagnetic support line.

The scour depth measuring device 38 also includes a magnetic probe 112 as shown in FIG. 3. The magnetic probe 112 is preferably a commercially available ceramic magnet having a diameter $D_M$ smaller than the internal diameter $D_P$ of the passageway 42 such that the magnetic probe 112 can freely travel axially within the passageway 42. A nonferromagnetic support line 114 is attached to the magnetic probe 112 at a probe connector ting 116 in a conventional manner. A ceramic magnet is preferred because of the high ratio of magnetic strength to weight achievable with such magnets. Other magnets, such as other fixed magnets or electromagnets are within the scope of the invention. Substitution of such magnets will be obvious to those skilled in the art, including in the case of an electromagnet the use of an electrical conductor to supply energization current to activate the electromagnet.

Figure 4:
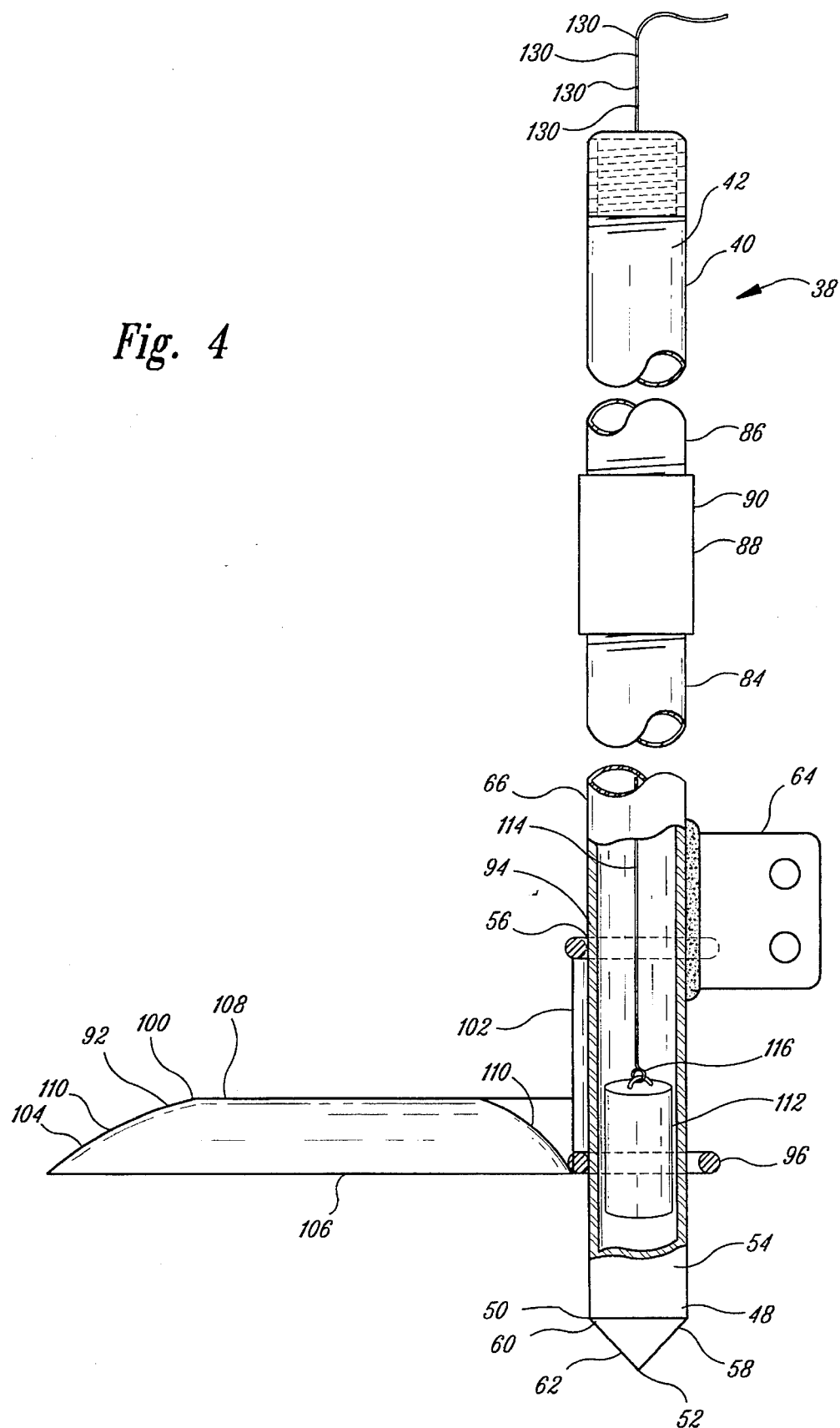
FIG. 4 is a side elevational view in partial cross-section of the preferred embodiment of the invention including the magnetic probe and support line.

Preferably the magnetic probe 112 is of sufficient magnetic strength to support the magnetic probe 112 in substantial alignment with the main body 100 of the bed detector 92 as shown in FIG. 4. The support line 114 is at least as long as the distance from the upper end 46 to the maximum expected scour depth.

Operation of the inventive device will now be described with reference to FIGS. 4 and 5. In use, the scour depth measuring device 38 is positioned alongside a waterway structure 118 mounted in a waterway bed 120 with the conical plug 52 positioned to penetrate the waterway bed 120. A penetrating portion 122 of the elongated guide 40 is driven into the waterway bed 120, typically by hammering the pipe into the waterway bed preferably to a depth at least twice the expected maximum depth of scour.

The elongated guide 40 is then attached to the waterway structure 118 by bolting the support brackets 64 to the waterway structure 118 or to an adaptor such as a strapping device. Other methods of attachment may also be used. If expected water flow is sufficiently high or it is anticipated that debris in the waterway might strike the elongated guide, a stiffener 124 may be added to provide further support and resist bending of the guide. As shown in FIG. 5, the elongated guide is preferably of sufficient height to extend above an expected high water level 126. However, because the cap 68 is able to form a watertight seal, using teflon tape if necessary, at the upper end 46 of the elongated guide, the scour depth measuring device 38 will withstand water levels exceeding the expected high water level.

Where the waterway structure includes ferromagnetic material, the elongated guide is preferably sufficiently far from the ferromagnetic material in the waterway structure that the magnetic probe 112 will not be affected during the measurement procedure described below.

After the elongated guide is in place and attached to the waterway structure, the bed detector 92 is slidably coupled to the elongated guide 40 by aligning the coupling rings 94, 96 axially with the elongated guide and permitting the bed detector to slide toward the waterway bed 120. The bed detector then descends to the waterway bed and rests there.

An initial waterway depth is then measured while the bed detector 92 is in this initial position. To make the measurement, a user first unscrews the cap 68 and inserts the magnetic probe 112 into the passageway 42. Then the user controllably feeds the support line, allowing the magnetic probe to descend toward the waterway bed 120. As the magnetic probe travels downwardly within the passageway 42, it eventually comes into alignment with the bed detector 92, as shown in FIG. 4. The magnetic attraction between the magnetic probe and the ferromagnetic material of the main body 100 inhibits the downward progress of the magnetic probe when the magnetic probe is substantially aligned with the main body. At this point, the tension in the support line 114 will change noticeably, indicating to a user that the probe is in alignment with the bed detector 92. The user then measures the length of the support line from the magnetic probe 112 to the opening 44 at the upper end 46 of the passageway 42 and subtracts the length of the support line from the elevation of the guide upper end 46, thus obtaining the elevation of the bed detector 106, therefore, the depth of scour. To facilitate this measurement, the support line preferably is marked with a plurality of indicators 130 which represent premeasured distances from the magnetic probe 112. Thus to measure the support line length, the user need only read the indicator most closely aligned with the opening. Generally, the user then removes the magnetic probe and reattaches the cap 68.

Figure 5:
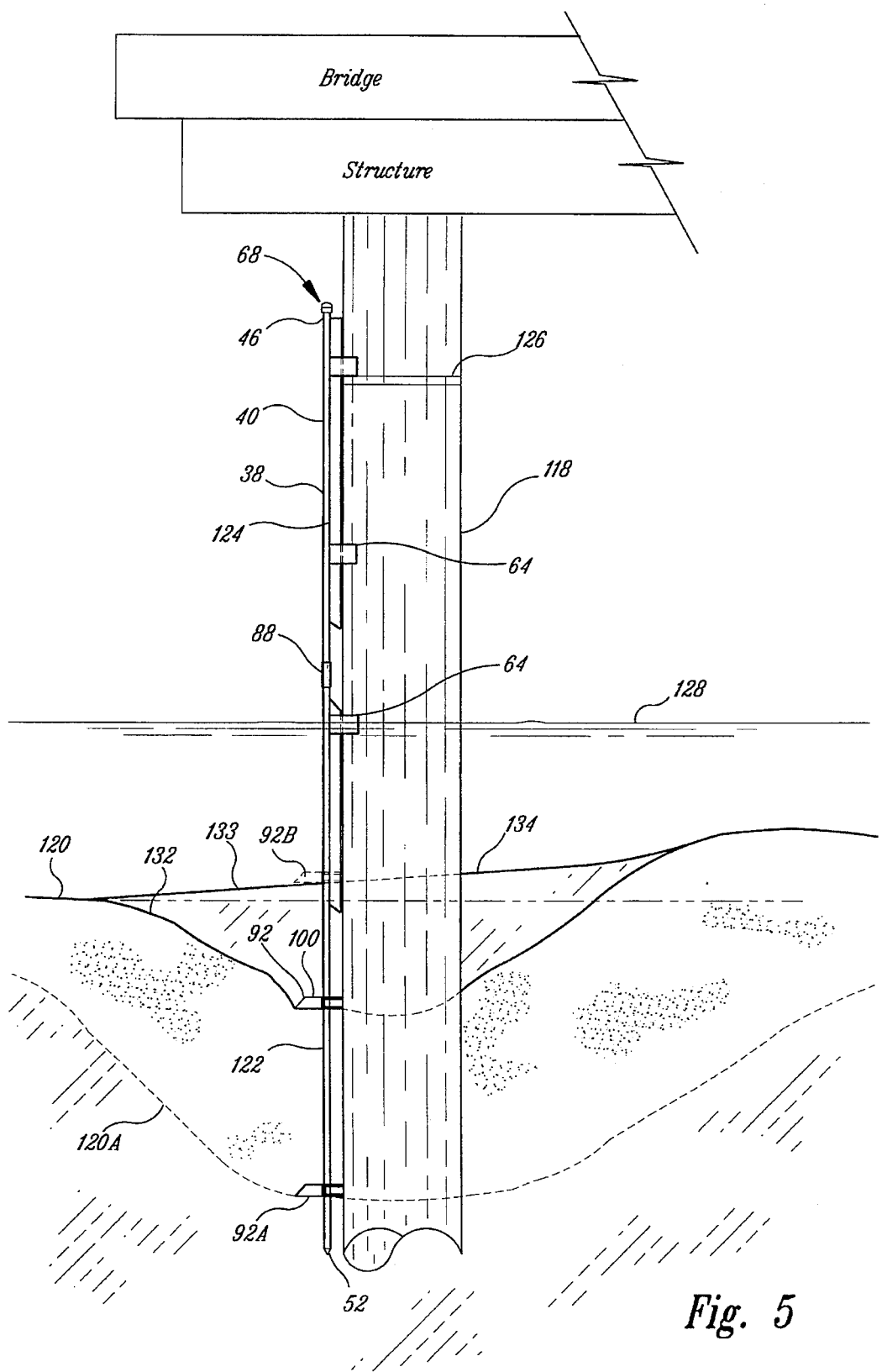
FIG. 5 is a cross-section of a river bed adjacent to a bridge piling illustrating the use of the device attached to a waterway structure and utilizing two bed detectors.

As time passes, scour evacuates a portion of the river bed 132, creating a new waterway bed 120A at a greater depth than the original waterway bed 120, as shown in the broken line in FIG. 5. As the scour occurs, the bed detector 92 descends with the changing waterway bed, eventually moving to the depth of the new waterway bed 120A, as indicated at 92A in FIG. 5.

At a second point in time, the user repeats the above-described measuring steps to determine the depth of the new waterway bed 120A. By comparing the depth of the original waterway bed 120 with the new waterway bed 120A, the scour depth may be determined easily.

The present invention also advantageously provides a capability to measure scour depth beneath subsequent infill. As time passes, sediment settles in the scoured area, creating a secondary surface 134 which may appear visually to be the waterway bed 120. However, because the sediment is typically softer than the riverbed 132 it provides little or no support to the waterway structure 118. Thus, the secondary surface gives the impression that more support remains for the waterway structure than actually exists. The present invention reduces this problem because the bed detector 92 remains upon the waterway bed 120 during the infill process, beneath the infill. It therefore provides an accurate measurement of the depth of the true waterway bed 120, regardless of the visual appearance.

Additionally, a second bed detector 92B may be utilized to determine the depth of the infill layer 133 or to monitor the stability of an imported repair material. To measure the depth of the infill layer, a user attaches the second bed detector 92B to the elongated guide 40 after infill has occurred and permits the second bed detector 92B to descend toward the waterway bed 120. When the second bed detector 92B reaches the secondary surface 134 of the infill layer, it rests there. The user then inserts the magnetic probe and measures the elevation of the infill layer as described above.

It should be noted that the use of the second bed detector 92B does not prevent the user from measuring the depth of the true waterway bed 120 using the original bed detector 92. To determine the depth of the bed detector 92 beneath the second bed detector 92B, the user permits the magnetic probe 112 to descend to the level of the second bed detector 92B. After making the measurement of the depth of the second bed detector 92B, the user lifts the magnetic probe a slight distance above the second bed detector 92B, then permits the magnetic probe to descend rapidly. The momentum of the magnetic probe is sufficient to overcome the magnetic attraction between the magnetic probe 112 and the second bed detector 92B, so the magnetic probe descends past the second bed detector 92. The user then permits the magnetic probe to controllably descend toward the bed detector 92. When the magnetic probe 112 is substantially aligned with the bed detector 92, the user detects a reduction in the tension in the support line and, as described above, may determine the depth of the waterway bed. By subtracting the determined depth of the secondary surface 134 from the depth of the waterway bed 120, the depth of the infill can be determined. Similarly, the stability of imported scour repair fill can be monitored.

The above description presents the preferred embodiment of the present invention. However, those skilled in the art will understand that the features of different embodiments may be combined without the features departing from the scope of the invention.

For example, as shown in the preferred embodiment, the support line 114 is a flexible cable. However, other types of support lines, such as metal chains, may be used. Also, while the magnetic probe 112 is preferably of sufficient magnetic strength to support itself in alignment with the bed detector 92, a less powerful magnet can be used, though this may require closer monitoring of the support line to identify the alignment position.

Similarly, while the elongated guide is preferably of stainless steel, other nonmagnetic materials may be used where conditions permit. Where the strength of the elongated guide 40 or its ability to withstand impact from debris in the waterway is not critical, a softer material such as brass or plastic may suffice.

As shown in FIG. 4, the support bracket 64 is adapted for attachment to a waterway structure 118 using bolts. However, other methods for attachment, such as strapping, will be obvious to those skilled in the art.

As shown in FIG. 5, the elongated guide 40 is preferably positioned substantially vertically. However, in some applications it may be desirable to position the elongated guide at some angle to the waterway bed while still having a sufficient vertical component to permit the bed detector to descend under the influence of gravity. Also, while the elongated guide is shown attached to a waterway structure 118 for which the measurement of scour depth is to be made, it is not absolutely necessary that the elongated guide be mounted to the waterway structure 118. For example, in some applications where waterway flow and debris do not demand such substantial support, the elongated guide may be self-supporting.

Equivalent structure may be substituted for the structure described herein to perform the same function in substantially the same way and fall within the scope of the present invention. For example, the vertical guide may have a noncircular cross-section which may or may not conform closely to the shape of the magnetic probe. Similarly, the magnet and the ferromagnetic material may be interchanged. That is, the bed detector may include a magnet permitting the probe to use a simple piece of ferromagnetic material. The invention is therefore described by the claims appended hereto and is not restricted to the embodiments shown herein.

We claim:

1. An apparatus for measuring scour depth of an immersed waterway bed adjacent a structure, comprising:

an elongated guide of a nonferromagnetic material, the guide having a lower end and an upper end, the guide further having a portion of the upper end defining an opening and the guide having an internal portion defining a substantially vertical passageway within the guide extending from the opening toward the lower end;

a bed detector member having a slidable connection for connecting the bed detector member to the guide for movement under the influence of gravity toward the waterway bed, the bed detector member being external to the passageway, at least a portion of the bed detector member being ferromagnetic, and the bed detector having a contact surface for engaging the waterway bed;

a magnetic probe positionable within the passageway for unobstructed axial travel within the passageway, with the magnetic attraction of the probe to the ferromagnetic portion of the bed detector inhibiting descent of the probe when the probe is positioned in juxtaposition to the bed detector member; and a support line connected to the probe and extendible through the opening in the upper end of the guide, so that the elevation of the bed detector may be determined by manipulation of the support line.

2. The apparatus of claim 1 wherein the guide is of a length so that, when positioned in the waterway, the guide extends from a position near the waterway bed to above the waterway surface and the passageway defines an enclosure extending from the upper end toward the lower end, and wherein the passageway is sealed at its lower end to prevent the influx of water from the waterway and the opening is positioned above an upper surface of the waterway such that water from the waterway is excluded from the enclosure.

3. The apparatus of claim 2, further comprising a removable cap mateable to the guide at the upper end to seal the opening when the probe is outside of the passageway to prevent the entry of contaminants into the passageway.

4. The apparatus of claim 1, wherein the slidable connection includes a plurality of coupling rings, encircling a portion of the guide.

5. The scour depth measuring apparatus as described in claim 1 for measuring both an initial waterway bed depth and a depth of a secondary waterway bed above the initial waterway bed depth, such as that caused by deposition of material upon the waterway bed over the initial waterway bed, further comprising a second bed detector slidably connected to the guide above the first bed detector for engaging the secondary bed, a portion of the second bed detector being ferromagnetic to permit detection of the secondary bed depth.

6. The apparatus of claim 1 wherein the probe comprises a ceramic magnet.

7. The apparatus of claim 1 wherein the probe includes an electromagnet, further comprising means for supplying energization current to the electromagnet.

8. The apparatus of claim 1 wherein the support line further comprises indicia corresponding to the support line length.

9. The apparatus of claim 1 wherein the bed detector includes a planar lower surface comprising the contact surface and an upper surface including smoothly curved upper margins for reducing detector induced scour.

10. An apparatus for measuring scour depth of an immersed waterway bed adjacent a structure, comprising:

an elongated guide of a nonferromagnetic material, the guide having a lower end and an upper end, the guide further having a portion of the upper end defining an opening and the guide having an internal portion defining a substantially vertical passageway within the guide extending from the opening toward the lower end;

a bed detector member having a slidable connection for connecting the bed detector member to the guide for movement under the influence of gravity toward the waterway bed, the bed detector member being external to the passageway, at least a portion of the bed detector member being magnetic, and the bed detector having a contact surface for engaging the waterway bed;

a ferromagnetic probe positionable within the passageway for unobstructed axial travel within the passageway, with the magnetic attraction of the probe to the magnetic portion of the bed detector inhibiting descent of the probe when the probe is positioned substantially horizontally to the bed detector member; and a support line connected to the probe and extendible through the opening in the upper end of the guide, so that the elevation of the bed detector may be determined by manipulation of the support line.

11. The scour depth measuring apparatus as described in claim 10 for measuring both an initial waterway bed depth and a depth of a secondary waterway bed above the initial waterway bed depth, such as that caused by deposition of material upon the waterway bed over the initial waterway bed, further comprising a second bed detector slidably connected to the guide above the first bed detector for engaging the secondary bed, a portion of the second bed detector being magnetic to permit detection of depth of the secondary bed.

12. The apparatus of claim 10 wherein the bed detector member comprises a coupling ring, the coupling ring encircling a portion of the guide thereby forming the slidable connection.

13. A method for measuring scour depth in a waterway bed beneath a waterway surface at a location in a waterway with an elongated guide positioned within the waterway, a first bed detector member connected in slidable contact with the guide, and a probe connected to a support line, the probe and the bed detector member magnetically interacting comprising the steps of:

(a) initializing at a first measurement time the bed detector by permitting the bed detector to descend into contact with the waterway bed;

(b) controllably lowering the probe within a passageway in the guide toward the bed detector at a first measurement time;

(c) manipulating the probe to detect when the probe has descended to a position where its movement downward is inhibited by the magnetic attraction between the probe and the bed detector; and (d) monitoring the distance descended by the probe during its descent to the position where it interacts with the bed detector to determine the depth of the bed detector.

14. The method of claim 13 with a support line which includes indicia of support line length wherein the step of monitoring the distance traveled by the probe comprises reading the indicia of support line length.

15. The method of claim 13, further comprising the steps of:

(e) repeating, at a second measurement time, steps (b)–(d); and (f) comparing the depth determined at the first measurement time with the depth determined at the second measurement time.

16. The method of claim 13, further comprising the steps of:

(e) slidably connecting a second bed detector member to the guide, the second bed detector being adapted for magnetic attraction to the probe;

(f) at a second measurement time, sufficiently after the first measurement time to permit material, such as infill, or imported protective fill to cover the first bed detector, positioning the second bed detector on a secondary waterway bed;

(g) manipulating the probe to detect when the probe has descended to a position where it interacts with the second bed detector;

(h) monitoring the distance descended by the probe during its descent to the position where it interacts with the second bed detector to determine the depth of the second bed detector; and (i) comparing the elevation of the first bed detector member and the elevation of the second bed detector.

* * * * *